July 28, 1953  H. B. BARRETT  2,646,836
BRAKE LINING CLAMP
Filed April 19, 1950  2 Sheets-Sheet 1
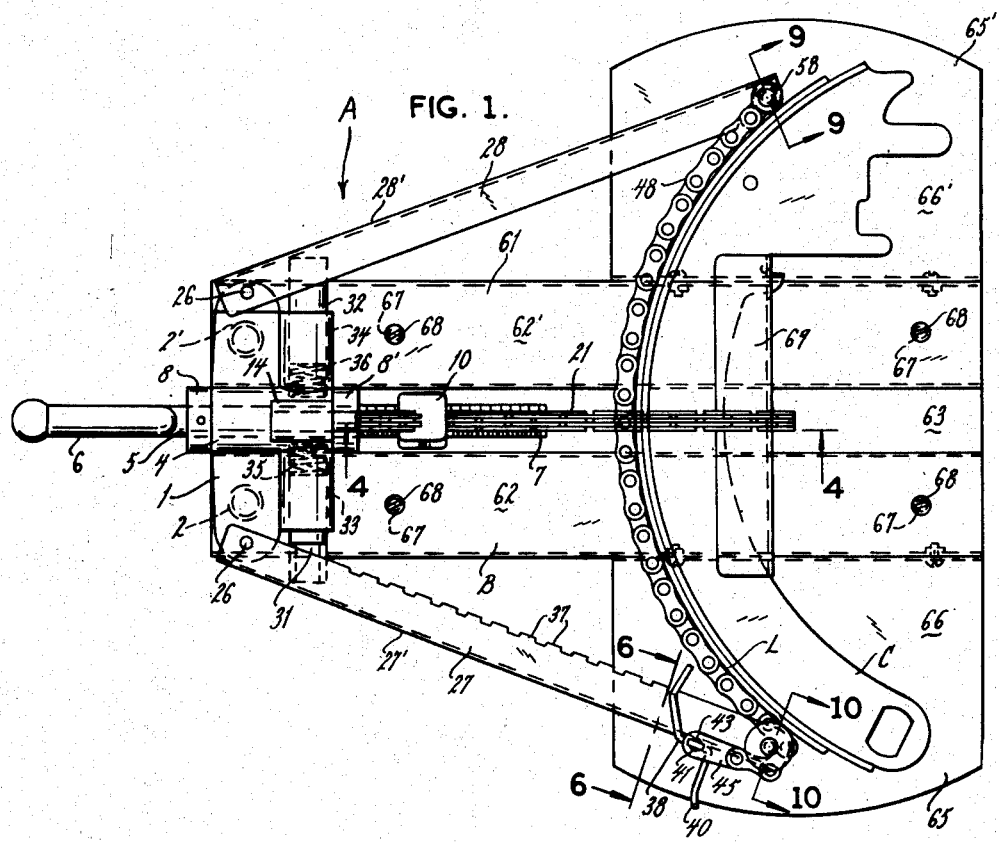
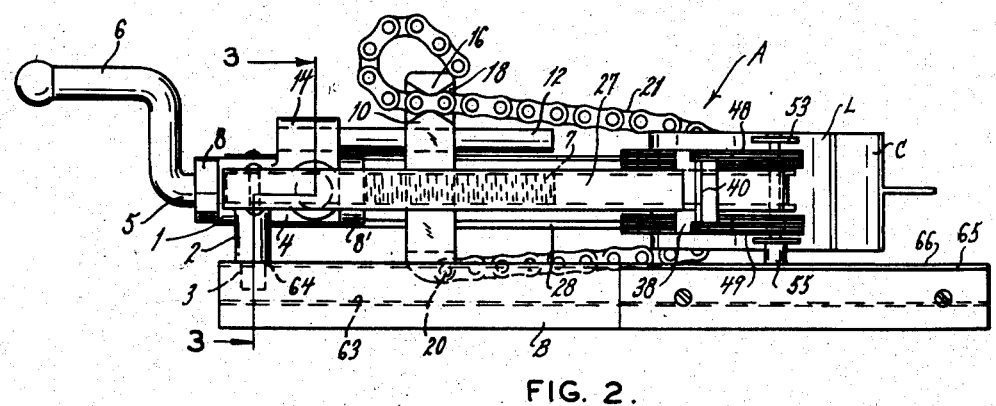
INVENTOR.
HARRY B. BARRETT
BY
ATTORNEY July 28, 1953 — H. B. BARRETT — 2,646,836
BRAKE LINING CLAMP
Filed April 19, 1950 — 2 Sheets-Sheet 2

INVENTOR.
HARRY B. BARRETT
BY *[signature]*
ATTORNEY

Patented July 28, 1953

2,646,836

UNITED STATES PATENT OFFICE 2,646,836

BRAKE LINING CLAMP

Harry B. Barrett, St. Louis, Mo.

Application April 19, 1950, Serial No. 156,834

6 Claims. (Cl. 154—1)

This invention relates in general to clamps and, more particularly, to certain new and useful improvements in brake lining clamps, that is to say, clamps for use in applying lining to automotive brake shoes.

It is the primary object of the present invention to provide a clamp of the character stated which provides a positive, radially directed, and uniformly equalized pressure upon a lining in order to secure it snugly throughout its length to the face plate of a brake shoe.

It is a further object of the present invention to provide a clamp of the character stated which incorporates means for readily adapting same for use with linings and brake shoes of varying size.

It is an additional object of the present invention to provide a clamp of the character stated having easily operated control means for regulating and equalizing the contactive pressure applied against the lining in securing same to a brake shoe.

It is a further object of the present invention to provide a clamp of the character stated having associated therewith a co-acting mounting platform or fixture for supporting the clamp during application to the brake shoe and lining.

It is still a further object of the present invention to provide a clamp of the character stated which is economical in construction and reliable and durable in usage.

With the above and other objects in view, my invention resides in the novel features of form, construction, arrangement, and combination of parts presently described and pointed out in the claims.

In the accompanying drawings (two sheets):

Figure 1 is a top plan view of a brake lining clamp constructed in accordance with and embodying the present invention, illustrating the clamp mounted upon the mounting plate in operative position;

Figure 2 is a side elevational view of the brake clamp in operative position;

Figure 3:
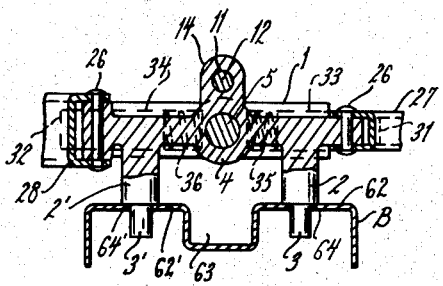
Figure 3 is a transverse sectional view taken along line 3—3 of Figure 2.
Figure 10:
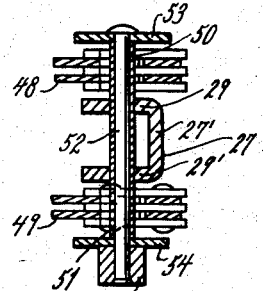
Figure 10 is a transverse sectional view taken along line 10—10 of Figure 1.
Figure 4:
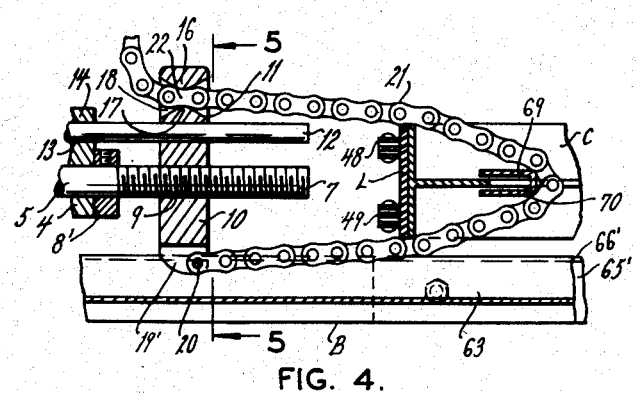
Figure 4 is a fragmentary transverse sectional view taken along line 4—4 of Figure 1.
Figure 5:
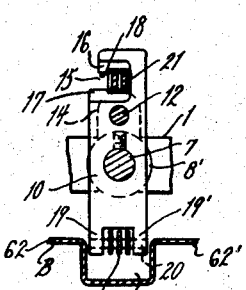
Figure 5 is a transverse sectional view taken along line 5—5 of Figure 4.
Figure 6:
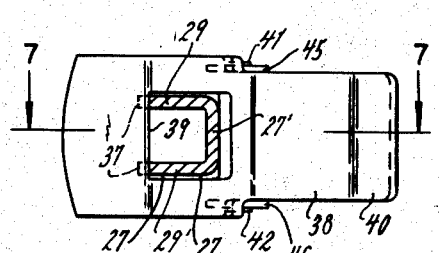
Figure 6 is a transverse sectional view taken along line 6—6 of Figure 1.
Figure 9:
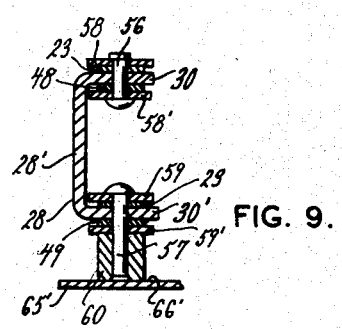
Figure 9 is a transverse sectional view taken along line 9—9 of Figure 1.

Referring now in more detail and by reference characters to the drawings, which illustrate a preferred embodiment of the present invention, A designates a brake lining clamp comprising a central T-shaped casting or body member 1 integrally provided with a pair of downwardly depending spaced legs 2, 2', diametrally decreased at their lower ends in the formation of tip-portions 3, 3', respectively. The casting 1 is also integrally provided with a tubular shank 4 and extending rotatably therethrough is a crank member 5 having an offset handle 6 formed on its outwardly projecting end and being threaded on its inwardly projecting portion in the provision of a lead screw 7. Pinned or otherwise rigidly mounted upon the crank 5 are retaining collars 8, 8', abutting against the casting 1 to prevent unauthorized axial shifting of the crank 5. The screw 7 projects through a threaded aperture 9 provided in a vertically disposed cross arm 10, which is further provided with a drilled aperture 11, spacedly above the aperture 9 and in axial parallelism therewith. Projecting through the aperture 11 is a guide rod 12 rigidly fixed at one of its ends within a suitable bore 13 provided in a boss 14 integral with, and projecting upwardly from, the casting 1.

Adjacent its upper end and on one side thereof, the cross arm 10 is relieved to form a recess 15 with the upper wall thereof being beveled inwardly and downwardly from its longitudinal margins toward the center thereof and with the lower wall thereof being complementarily beveled to provide a central ridge 17 which forms a constricted passage 18 for purposes appearing more fully hereinafter. Integrally formed on the bottom of the cross arm 10 is a pair of spaced, depending lugs 19, 19', apertured for receiving the ends of a rivet pin 20 extending therebetween for pivotally supporting one end of a conventional roller chain 21.

Figure 7:
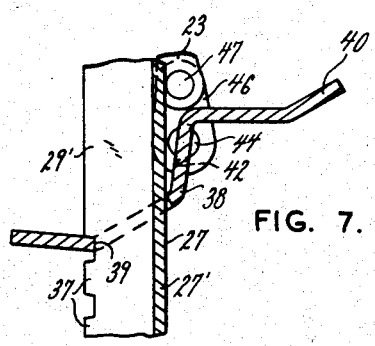
Figure 7 is a transverse sectional view taken along line 7—7 of Figure 6.
Figure 8:
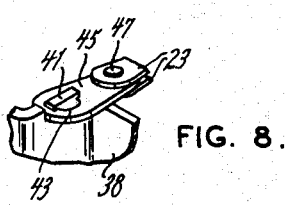
Figure 8 is a fragmentary perspective view illustrating the engagement between the locking pawl and the chains.

Pivotally mounted, as by pins 26, to either side of the casting 1 are channel-shaped arms 27, 28, having central webs 27', 28', respectively, and inwardly directed parallel flanges 29, 29', and 30, 30', respectively. Projecting into the channels of said sections 27, 28, for abutment against the inner face of the webs 27', 28', thereof, are plungers 31, 32, respectively, slidably disposed within longitudinally extending bores 33, 34, formed in the casting 1, and which terminate outwardly of the tubular shank 4 (see Figure 3). At their inner ends, the plungers 31, 32, abut against coil springs 35, 36, respectively, which, in turn, abut against the end face of the bores 33, 34. Thus, through the bias of the springs 35, 36, a positive outwardly directed pressure is exerted by the plungers 31, 32, against the channel members 27, 28, respectively, biasing same into equiangular or symmetrical position with respect to the longitudinal axis of the shank 4. The channel member 27 is slightly narrower than the channel member 28 and the longitudinal margins of the flanges 29, 29', thereof are notched to provide a plurality of spaced aligned ratchet-like teeth 37 for engagement with a pawl-like lock member 38 having an enlarged rectangular aperture 39, permitting freely movable disposition of said pawl 38 upon the channel section 28. At its inner end, the pawl 38 is bent forwardly in order to present the inner vertical margin of the aperture 39 for optional engagement with the teeth 37, as may be seen in Figure 7, and at its outer end, said pawl 38 has a rearwardly directed finger-tab 40 against which the user may apply pressure for operating the pawl 38, as will be described. Adjacent and inwardly of the finger-tab 40, the pawl 38 is provided with oppositely projecting lateral ears 41, 42, each of which extends through enlarged apertures 43, 44, of links 45, 46, respectively, the upper ends of said ears 41, 42, being flattened or peened for maintaining said links 45, 46, thereon.

At their opposite ends, the link members 45, 46, are each secured as by rivets 47 to a pair of connecting links 23 of upper and lower roller chains 48, 49, respectively. Said chains 48, 49, are led forwardly adjacent the outer face of the wall 27' of the channel 27 and about guide sections 50, 51, respectively, provided at the forward ends of said channel 27 above and below the channel walls 29, 29', respectively, by a roller pin 52 having metallic, retaining washers 53, 54. Mounted upon the roller pin 52 adjacent its lower end is a spacer member 55. Said chains 48, 49, are thence led across the clamp A in normal, substantially parallel relation to the longitudinal axis of the body member and are respectively pivotally secured to the channel-forming walls 30, 30', of the channel 28 by rivets 56, 57, respectively, each of said rivets 56, 57, having a pair of metallic washers 58, 58', and 59, 59'. The rivet 57 is of slightly greater length than the rivet 56 and projects at its lower end substantially below the under face of the channel wall 30', upon which projecting portion there is suitably mounted a spacer 60.

Thus, it will be seen that the length of the portion of the chains 48, 49, extending between the channels 27, 28, may be regulated by the operation of the pawl 38. Rearwardly directed pressure may be applied by the user against the finger-tab 40 of the pawl 38 whereby a pivoting center will be developed about the point of abutting contact between the outer vertical margin of the aperture 39 and the wall 27' of the channel 27, thus causing the inner end of the pawl 38 to be swung forwardly, freeing it from engagement with the teeth 37. The operator, by pulling rearwardly on the now disengaged pawl 38 may draw the chains 48, 49, rearwardly, shortening the lengths thereof between the channels 27, 28, or, by moving the pawl 38 forwardly, the lengths of the chains 48, 49, between said channels 27, 28, will be increased. Once the desired adjustment has been reached, the pawl 38 is then locked in selected position. It will be noted that, in such operation, the chains 48, 49, move about the guide sections 50, 51, with minimum friction and thereby easily control the inward or outward pivotal movement, as the case may be, of the channels 27, 28, about the pivots 26. As said channels 27, 28, are caused to move toward each other by shortening of the chains 48, 49, the plungers 31, 32, are correspondingly driven inwardly against the pressure of the springs 35, 36, and thereby prevent unauthorized inward movement of the channels 27, 28, beyond the position desired.

Provided for support of the clamp A is a mounting platform B fabricated preferably of sheet metal and comprising a central elongated section 61 having a pair of elevated flat faces 62, 62', separated by a central groove 63 and provided adjacent their rear margins with apertures 64, 64', respectively, for receiving the tip-portions 3, 3', of the legs 2 when the clamp A is disposed thereon. Suitably secured, as by rivets, to, and extending laterally on, either side of the section 61 adjacent the forward end thereof are wing-plates 65, 65', having upwardly presented flat faces 66, 66', flush with the faces 62, 62'. The mounting platform B is further provided with a plurality of spaced apertures 67 for receiving screws 68 whereby said platform B may be rigidly secured to a conventional workbench (not shown).

In usage, the clamp A is positioned upon the platform B with the legs 2 extending through the apertures 64, 64', as hereinabove described, and with the lower faces of the spacers 55, 60, resting upon the upper face of the wing 65, 65', (see Figure 2). The chain 21 is led forwardly through the groove 63 and, being of greater length, will extend beyond the forward end of said platform B for ready handling thereof, as will be shown hereinafter. A section of brake lining L, suitably coated on its rear face with a conventional heat-setting cementitious material, is placed against the contact face of a conventional automotive brake shoe C and the assembly then set down upon the mounting platform B with the outer face of the lining L disposed against the chains 48, 49, as seen in Figure 1.

The clamp A is adjusted in the manner above described with the lengths of chains 48, 49, between the channels 27, 28, being lengthened or shortened, as the case may be, to provide substantial contact along the brake lining L. Thus, the clamp A is adaptable for use with automotive brake shoes of any commonly used size. Since it is not necessary to the effective operation of the clamp A, the ends of the lining L are not in contactive engagement with the chains 48, 49, whereby ample space is provided for end-riveting (not shown), if desired, before the brake shoe is utilized, although, in some types of brake lining cementing systems, such rivets are not employed and the present invention is equally applicable to either system. Loosely positioned on the central portion of the web projecting from the opposite face of the brake shoe C is a channel support member or brake shoe gripping means 69 fabricated of preferably a medium gauge metal stock and having a channel 70 substantially as wide as the thickness of the web in order to provide a relatively snug fit thereon. It will thus be seen that the channel support 69 presents a longitudinal surface, bridging, as it were, the central portion of the arc of the web in substantial parallelism with the longitudinal axis of the base member 1. The free end of the chain 21 is then lifted and brought into direct engagement with the central portion of the channel support 69 and is thence led rearwardly over the brake shoe C and the appropriate section 22 thereof is lodged in the constricted passage 18 of the recess 15 or the cross arm 10, it being seen that the central recessed portions of the various links of the chain 21 are snugly held by the center portions 16, 17, of the recess 15, with the adjacent outwardly curved portions of the links being held by the beveled faces of the recess 15, thereby preventing any unauthorized axial movement of the chain 21 (see Figure 2). Said chain 21 is firmly engaged about the channel support 69 and the brake shoe C. Thereupon, the crank 5 is rotated to effect rearward traverse of the cross arm 10 along the screw 7. Such rearward movement will cause the brake shoe C to be moved rearwardly into tight engagement with the chains 48, 49, whereby the arcuate shape of the brake shoe C causes said chains 48, 49, to flex, rearwardly into conformance therewith. The rearward flexing thereof will be determined by the length of the chains 48, 49, extending between the channel sections 27, 28, as may be seen in Figure 1. Thus, it may be apparent that tight, snug-fitting contact is assured between the chains 48, 49, and the face of the brake lining L. Clamping engagement is, thus, maintained throughout substantially the length of the lining L, with radially directed pressure being applied along the arc of the brake lining L. The development of any untoward distortional force or deflective pressure is prevented by the even distribution and equalization of radial pressure so applied. The unique brake lining clamp, herein described, causes the lining L to lie smoothly and evenly upon the shoe C, and thereby prevents the formation of minute air pockets with consequent ridges and protuberances which would materially decrease the effective adherence of the lining and impair operation of the brake.

Thereupon, the clamp A, with the shoe C held thereto, in the manner described, may be lifted from the mounting platform B and placed in any convenient location, which, dependent upon the adhesive used, may be an oven, to permit adequate time for the particular cementitious material utilized to set, and thereby free the mounting platform B for use in conjunction with other clamps A.

It should be understood that changes and modifications in the form, construction, arrangement, and combination of the several parts of the brake lining clamp may be made and substituted for those herein shown and described without departing from the nature and principle of my invention.

Having thus described my invention, what I claim and desire to secure by Letters Patent is:

1. A clamp for applying a lining to brake shoes comprising a body member, a pair of diverging arms pivotally mounted at one end of said body member, a first flexible member extending between the diverging arms and adapted for contactive engagement with the lining of a brake shoe, means for adjusting the length of the first flexible member to accommodate various sizes of linings, a cross arm shiftably mounted for movement within prescribed limits upon said body member, and a second flexible member adjustably mounted on said cross arm, a brake-shoe gripping jaw engaged by the second flexible member, and means for shifting the cross arm to any selected position within the limits of its movement for regulating the contactive pressure between the first flexible member and the brake shoe lining.

2. A clamp for applying a lining to a brake shoe comprising a body member, a pair of outwardly diverging arms pivotally mounted at one of their ends on opposite sides of said body member, a flexible member extending between said diverging arms at their other ends and adapted for contactive engagement against the lining of a brake shoe, means mounted upon one of said diverging arms for adjusting the effective length of said flexible member, plunger members slidably disposed in said body member and adapted for abutting engagement with said diverging arms to prevent unauthorized pivoting thereof during operation, a crank member mounted in said body member, and tension regulating means associated with said crank for controlling the contactive pressure between said flexible member and the brake lining.

3. A clamp for applying a lining to a brake shoe comprising a body member, a pair of diverging arms pivotally mounted at one of their ends on opposite sides of said body member, a flexible member extending between said diverging arms at their other ends and adapted for contactive engagement against the lining of a brake shoe, means mounted upon one of said diverging arms for adjusting the effective length of said flexible member, spring-pressed plunger members slidably disposed in said body member and adapted for abutting engagement with said diverging arms to prevent unauthorized pivoting thereof during operation, a crank member mounted in said body member, and tension regulating means associated with said crank for controlling the contactive pressure between said flexible member and the brake lining.

4. A brake shoe clamp comprising a central body member, a rod rotatably mounted in and extending through the central body member, said rod being threaded on its extended end, a block threadedly mounted on said threaded end, means operatively engaging the block and the central body member for preventing rotative movement of the block with reference to the body member as the rod is turned so that the block will traverse toward and away from the body member responsive to rotative movement of the rod, a flexible member attached at one end to the block and adjustably connected at its other end to the block to form a brake shoe encircling loop the length of which may be adjusted within predetermined limits, a pair of arms pivotally mounted on the body member on opposite sides of the rod and adapted for outward swinging movement substantially in the plane of the longitudinal axis of the rod, a second flexible member operatively mounted on the outer ends of said arms and extending therebetween, and means on one of said arms for adjusting the length of the portion of said flexible member extending between the arms.

5. Clamping apparatus for use in applying a lining to a brake shoe comprising a body member having depending pin-like elements, a pair of support arms swingably mounted at one of their ends upon said body member, a flexible member extending between said support arms at their other end and adapted for contactive engagement with the lining of a brake shoe, said member being adjustably connected to at least one of the arms so that the length of the portion of said member extending between the arms may be varied within predetermined limits, brake shoe gripping means for regulating the contactive pressure between said flexible member and the brake lining, a mounting platform having a depressed channel for clearing the brake shoe gripping means, and laterally extending flat faces having apertures for retentively receiving the pin-like elements of the body member whereby to support said clamp and brake shoe during clamping operation.

6. Clamping apparatus for use in applying a lining to a brake shoe comprising a body member having depending pin-like elements, support arms swingably mounted at one of their ends upon said body member and being provided at their outer ends with depending spacers, a flexible member extending between said support arms at their other end and adapted for contactive engagement with the lining of a brake shoe, said member being adjustably connected to at least one of the arms so that the length of the portion of said member extending between the arms may be varied within predetermined limits, a rod rotatably mounted in and extending through the body member and being threaded on its extended end, a cross arm disposed upon the threaded end of the rod for traversing movement therealong, a second flexible member adjustably connected to said cross arm and adapted for encircling disposition about the brake shoe in a direction transverse to the first flexible member for regulating the contactive pressure therebetween upon traversing movement of the cross arm, a mounting platform having a depressed channel for clearing the brake shoe gripping means, and laterally extending flat faces having apertures for retentively receiving the pin-like elements of the body member whereby to support said clamp and brake shoe during clamping operation, said platform also being provided with lateral wings for underlying sliding supportive engagement with the spacers.

HARRY B. BARRETT.

References Cited in the file of this patent

UNITED STATES PATENTS

| Number | Name | Date |
|---|---|---|
| 95,037 | Nichols | Sept. 21, 1869 |
| 425,736 | Bond | Apr. 15, 1890 |
| 889,754 | Brown | June 2, 1908 |
| 1,275,377 | Buckley et al. | Aug. 13, 1918 |
| 1,931,520 | Wisti | Oct. 24, 1933 |
| 2,122,554 | Brautigman | July 5, 1938 |